United States Patent [19]

Pascoe

[11] Patent Number: 4,831,583
[45] Date of Patent: May 16, 1989

[54] SYSTEM FOR SAVING PREVIOUS FORMAT PARAMETERS AND USING THE SAVED FORMAT PARAMETERS AND CHANGED FORMAT PARAMETERS TO FORMAT DATA OUTPUT

[75] Inventor: Robert A. Pascoe, Austin, Tex.

[73] Assignee: International Business Machines Corporation, Armonk, N.Y.

[21] Appl. No.: 859,600

[22] Filed: May 5, 1986

[51] Int. Cl.⁴ .............................................. G06F 3/12
[52] U.S. Cl. .................................. 364/900; 364/519;
364/943.43; 364/943.44; 364/930; 400/76;
400/279
[58] Field of Search ... 364/200 MS File, 900 MS File,
364/519; 400/63, 76, 279; 340/735

[56] References Cited

U.S. PATENT DOCUMENTS

| | | | |
|---|---|---|---|
| 4,086,660 | 4/1978 | McBride | 364/900 |
| 4,205,922 | 6/1980 | Pascoe | 400/76 X |
| 4,207,011 | 6/1980 | Pascoe | 400/76 X |
| 4,393,463 | 7/1983 | Aiken, Jr. | 364/900 |
| 4,441,829 | 4/1984 | Hebert, Jr. et al. | 400/63 |
| 4,460,975 | 7/1984 | Torkelsen et al. | 364/900 |
| 4,573,138 | 2/1986 | Gandet et al. | 364/900 |
| 4,607,966 | 8/1986 | Ueno et al. | 400/63 |
| 4,642,792 | 2/1987 | Clements et al. | 364/900 |
| 4,648,046 | 3/1987 | Copenhaven et al. | 364/518 |
| 4,648,047 | 3/1987 | Berkland et al. | 364/900 |
| 4,737,922 | 4/1988 | Ogasawara et al. | 400/279 X |

OTHER PUBLICATIONS

Heath et al.: "Method for achieving display/printer independence of a shared printer", IBM TDB vol. 26, No. 10B, Mar. 1984 pp. 5336-5339.
IBM DisplayWrite 1 User's Guide, Mar. 1984, International Business Machines Corporation, pp. 3-1 through 3-8.
IBM DisplayWrite 3 User's Guide, vol. 1, Nov. 1984, International Business Machines Corporation, pages 7-1 through 7-50.

Primary Examiner—Raulfe B. Zache
Assistant Examiner—Thomas C. Lee
Attorney, Agent, or Firm—Douglas H. Lefeve

[57] ABSTRACT

In a data processing system capable of responding to operator entered format parameter values the capability is provided for compactly storing directives for temporary formatting changes within text data. When temporary formatting directives are specified, the current values of the formatting parameters to be changed are stored, which enables their immediate and automatic return when the need for the temporary formatting change has passed. This is accomplished by the use of the following three new controls which are used within the text data stream: (a) the Begin Temporary Format Change, (b) the End Temporary Format Change, and (c) the Return to Previous Format. The first two of these controls are used to bracket the format change which is to take place and to identify that the format change contained therein is to be considered temporary so that the formatting states for the parameters to be changed can be remembered. The Return to Previous Format control is used to signify that the temporary format change is over and that the original formatting states whose values were stored in accordance with the Begin/End Temporary Format Change pair, are to be restored.

15 Claims, 6 Drawing Sheets

SYSTEM FOR SAVING PREVIOUS FORMAT PARAMETERS AND USING THE SAVED FORMAT PARAMETERS AND CHANGED FORMAT PARAMETERS TO FORMAT DATA OUTPUT

TECHNICAL FIELD

This invention relates to text processing systems in general and more particularly to a text processing technique which allows convenient temporary format changes of documents created, edited, or otherwise processed therewith.

BACKGROUND ART

In text processing, the format of the text is often controlled by formatting directives embedded in the text data stream. In prior art text processing programs, once these formatting directives are specified they become effective until they are changed by another directive. As such, the controls have no history. As soon as one of these controls is executed to change the value of a formatting parameter, the previous value of that formatting parameter, before modification, is forgotten by the system. Thus, in such systems, formatting changes become very restrictive because of the necessity of documenting the present values of the formatting parameters before they are changed temporarily, for those cases in which it is desired to return to an earlier format.

For example, a text application may process a long quotation by indenting the leading and trailing margin of the quotation, by changing the type font, and by changing the line spacing in a double spaced document to single spacing for the indented quotation. The original margin values, font choice, and line spacing are to be restored when the long quote is completed. In a modal system, such as that described above, when the long quote is formatted (when formatting directives are used to shift the margins and line spacing, and to change the font face), the value of the original margins, line spacing, and font face are lost to the process. When the long quote is over, the operator must reestablish the original margins, line spacing, and font face by keying new formatting directives. This assumes that the operator knew the value of the original margins, line spacing and, and font face before the temporary format changes. In some applications this may be true, but in less structured applications the operator may be keying text which will be composed to a specific margin, line spacing, and font at a later time. Thus, all the operator knows at the time of keying is that the margins are to be shifted in, the line spacing is to be changed, and the font is to be changed to italic for the long quotes, and further, that the current (but not necessarily original) format parameters are to be restored at the end of the quotation.

Therefore, in this less structured case, the final formatting of the text is linked to the final destination of the text data. If this final destination is *not* known at the time of the keying of the text, the formatting directives associated with the text cannot be input with the text, and the text will have to be edited for each subsequent composition. It is certainly desirable to format all of the text at the time it is keyed, thus eliminating the need to edit the text when it is being composed into its final form.

In the prior art, attempts have been made to surmount these problems by providing a master format buffer which stores a set of formatting states of a document. This technique has been expanded to include a second, alternate format buffer which stores an alternate set of formatting states of a document, as is the case with the IBM Personal Computer DisplayWrite 3 word processing program. In view of this, additional alternate format buffers are possible, but each of these master and alternate format buffers is a highly and extensively structured set of data which requires a significant storage overhead since the value of each formatting parameter is stored regardless of its equality to the values of the same formatting parameter in the other stored formats. Some portions, or all, of these stored formats can be reestablished, after a formatting change, through formatting directives provided by the architecture. However, this does not solve the problem of returning to the formatting values in effect immediately before a formatting change, because a return to the master or alternate format is a return to a formatting state established at the beginning of the document.

It would, therefore, significantly reduce both storage overhead for storing formatting parameter values and operator time in making formatting changes if a technique for temporary formatting changes was available which allowed a return to a previous format without having to remember anything about the values of that previous format.

SUMMARY OF THE INVENTION

Accordingly, the present technique provides the capability for compactly storing directives for temporary formatting changes within text data. Only the current formatting states affected by the temporary formatting directives are processed and stored, which relieves the process from having to consider all of the other formatting parameters which are to remain unchanged.

When temporary formatting directives are specified, the current values of the formatting parameters to be changed are stored, which enables their immediate and automatic return when the need for the temporary formatting change has passed.

This is accomplished by the use of the following three new controls which are used within the text data stream: (a) the Begin Temporary Format Change, (b) the End Temporary Format Change, and (c) the Return to Previous Format. The first two of these controls are used to delimit the format change which is to take place and to identify that the format change contained between this pair of controls is to be considered temporary so that the formatting states for the parameters to be changed can be remembered. The Return to Previous Format control is used to signify that the temporary format change is over and that the original formatting states whose values were stored in accordance with the Begin/End Temporary Format Change pair, are to be restored.

The Begin Temporary Format Change control contains one parameter: a Temporary Format Identifier (ID). Execution of the Begin Temporary Format Change control will cause storage space to be reserved for the one or more format states which are to be remembered, and an ID is assigned to that storage space. Next, the formatting directives following the Begin Temporary Format Change, but preceding the End Temporary Format Change control, are examined to determine which formatting states are to be changed. The current formatting states which are to be changed by the controls between the Begin Temporary Format Change and End Temporary Format Change control codes are saved in the storage area set aside by the Begin control. Following storage of the current formatting states, the formatting directives found between the Begin/End pair are executed, causing the new formatting states to be activated. The End Temporary Format Change control has no parameters, its only function being to delimit the end of the collection of format directives which are to be activated temporarily.

The Return to Previous Format control has three parameters: Condition, Value, and Temporary Format ID. The Condition parameter, coupled with the Value parameter, indicates when the control is to be executed For example, the condition may specify that the return to the previous format is to occur at the end of the current line, after ten lines have been presented, or after four inches of vertical distance have been occupied by succeeding, formatted text. Execution may be immediate, relative, or absolute, as described in more detail below. The Temporary Format ID indicates which of the stored formats is to be restored when the Return to Previous Format control is executed.

The foregoing and other objects, features, extensions, and advantages of the invention will be apparent from the following more particular description of a preferred embodiment of the invention, as illustrated in the accompanying drawing.

BEST MODE FOR CARRYING OUT THE INVENTION

Figure 1:
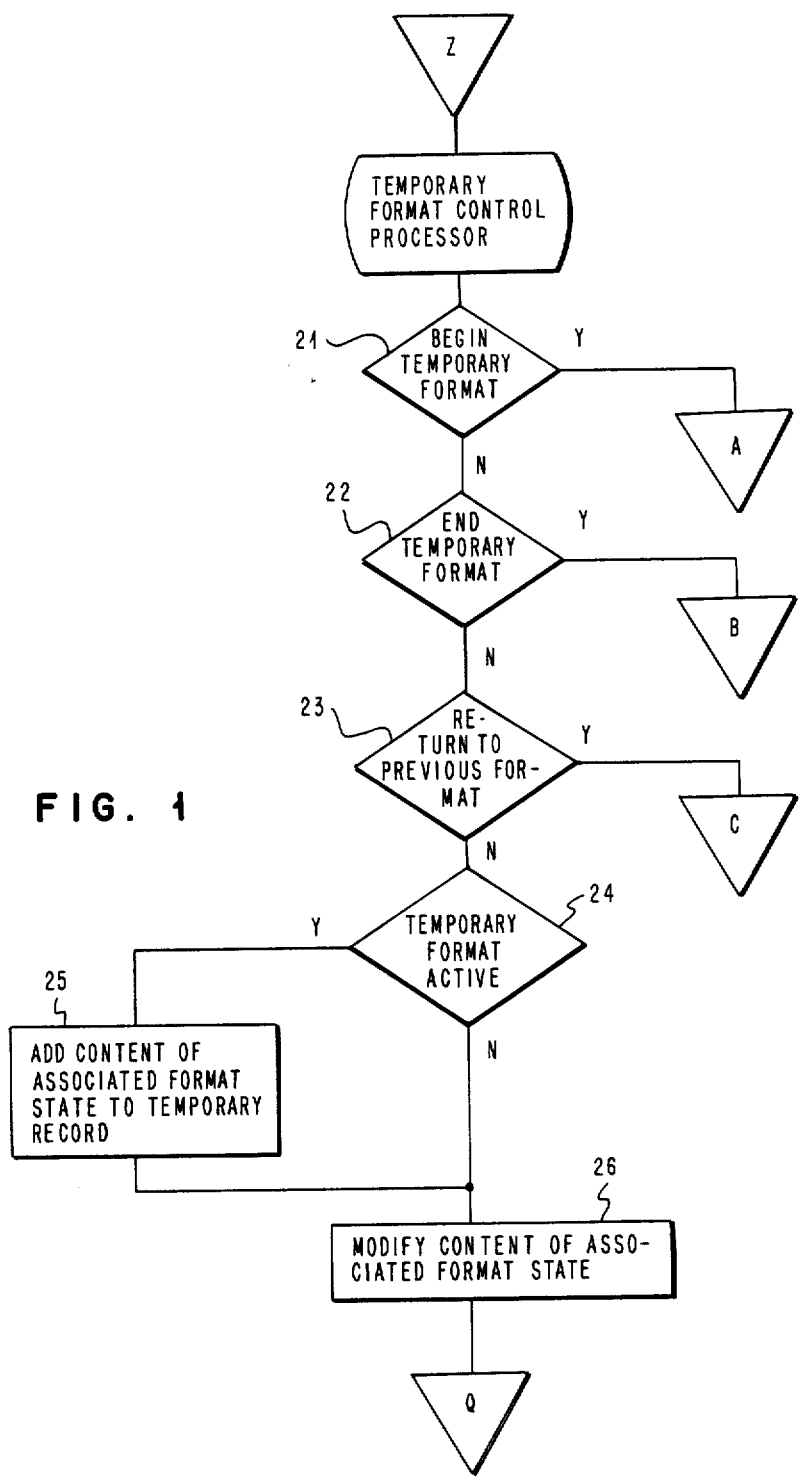
FIG. 1 is a programming flow chart which describes the logical operations performed in branching to the appropriate subroutines introduced by the additional control codes of this invention.

Beginning with the flow chart of FIG. 1 the routine denoted "Z" is integrated with the processing of a data stream in a system configured for text editing. It is important to note that, while at the present time the vast majority of text editing processes are implemented by the programming of some type of data processing system, these processes may also be accomplished by the appropriate logical circuit configuration of dedicated, hardware logical elements. The routine "Z" in FIG. 1 begins at a point in the text editing process between the entry of codes via keyboard or other input means and the collective memory storage of these codes in, for example, a traditional text storage buffer. This process may also be used in instances in which a previously generated text data stream is to be formatted for presentation purposes, such as for displaying or printing. The flow chart shown in FIG. 1 examines this input data stream for certain control codes and causes appropriate branching to additional routines upon the occurrence of these controls.

Referring again to FIG. 1, at block 21 a code in the input data stream is tested to determine if it is a Begin Temporary Format Change control code. If so, the operation branches to "A" which is shown in the flow chart of FIG. 2. If not, the code is tested at block 22 to determine if it is an End Temporary Format Change control code. If so, the operation branches to "B", FIG. 2, and, if not, the operation continues to block 23 at which point the code is tested to determine if it is a Return to Previous Format control code. If so, the operation branches to "C", FIG. 3, and, if not, the operation proceeds to block 24 where a test is performed to determine whether a Temporary Format is active, as will be described below. Thereafter, or in the event that a temporary format is not active, the operation proceeds to 26 to allow a formatting directive to modify the content of the associated format state.

Assume now that a Begin Temporary Format control code is detected in the data stream at block 21. In this case the operation branches to block 31 of the flow chart in FIG. 2. In this process the assembly of a record is begun. This record will consist of the existing format states in the system which will be altered by the format changes specified by the codes which are found between the Begin Temporary Format Change code and the End Temporary Format Change code. It is important to note that only the values of format parameters which are to be temporarily changed will be stored in this record of existing format states.

This assembled record of existing format states is stored in an allocated portion of random access memory, ordinarily separated from the data stream itself. In assembling this record of existing format states, at block 31 an identifier, specified in the Begin Temporary Format Change control, is placed at the beginning of the record which is being assembled. Thereafter, at block 32 a flag is set to indicate that a temporary format assembly is in progress. The set condition of this flag determines the path taken from block 24, FIG. 1. That is, if this flag is set, at block 24 in FIG. 1, a temporary format assembly *is* active. After this flag is set the operation returns to "Z" at the beginning of FIG. 1 for processing of succeeding codes in the data stream.

Following the processing of the Begin Temporary Format Change code as described above, assume that the next code encountered is a value of a formatting parameter to be changed. Depending on the system implementation, this value may be, for example, "left margin plus five units", which is a relative value, or the value may be absolute such as "left margin equals 20". In either case, this formatting parameter value represents none of the codes tested for at blocks 21, 22, and 23. However, since the flag indicating that a Temporary Format is active was set at block 32 in FIG. 2, the path through block 25 in FIG. 1 is taken. Therefore, the current margin value, before the Temporary Format change, is included with the content of the record which was begun at block 31, FIG. 2. Thereafter, the value of the format parameter is then modified at block 26, FIG. 1, to reflect the new, temporary, left margin.

Additional format parameter value changes may be specified in the succeeding codes that are tested at blocks 21-23. While the Temporary Format change is active, block 24 causes the data flow path to include block 25 which causes the storage of the current values of any temporary format changes to be added to the record identified by the ID of the Begin Temporary Format Change code that preceded these temporary format changes. Then, at block 26 the associated format state is modified to reflect the new value related to the specified format parameter.

Figure 2:
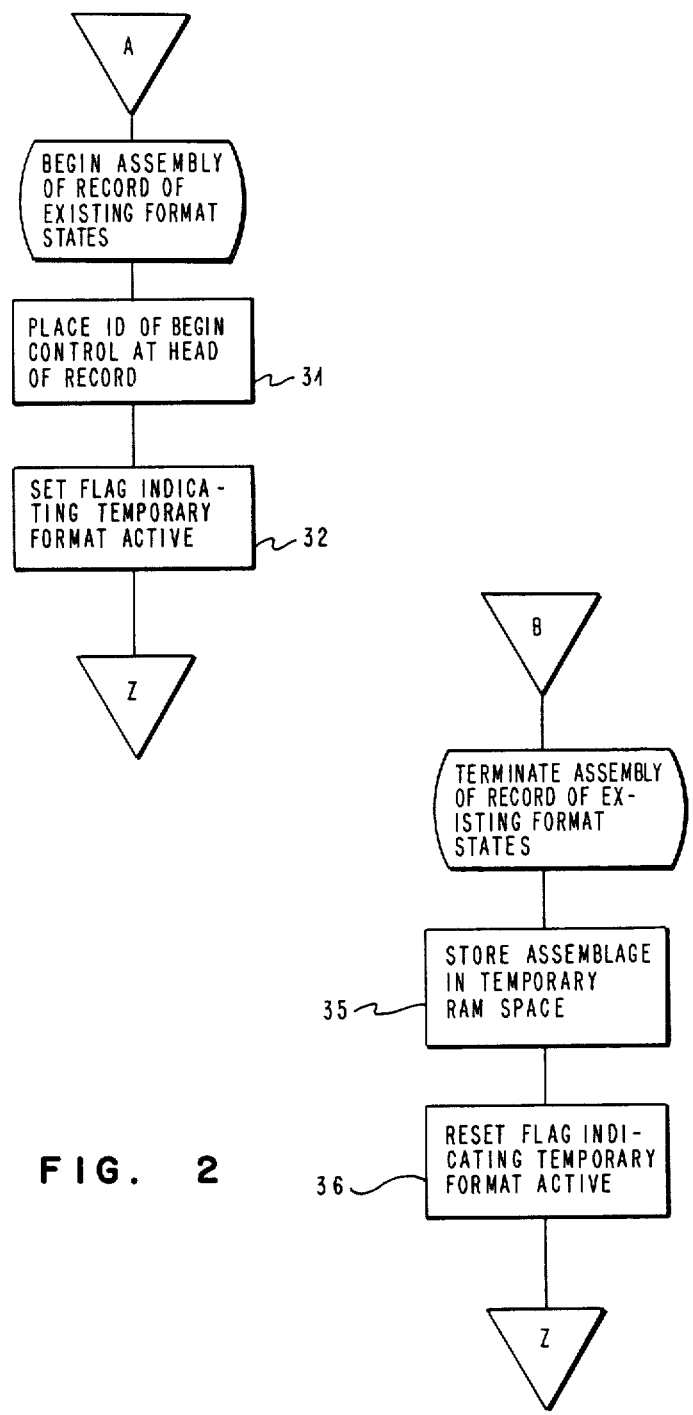
FIG. 2 is a programming flow chart which shows the processing of formatting data in accordance with the Begin/End Temporary Format Change control code pair.

After all of the new values for specified format parameters to be changed have been processed as described above, an End Temporary Format Change control code is detected at block 22 which causes the operation to branch to "B" in FIG. 2. At this point the assembly of the record containing the current format states that are being temporarily changed is terminated at block 35. This record containing the preexisting values of the formatting parameters (before they were temporarily changed) is stored in the system's random access memory, separate from the storage of the text data stream. The operation then proceeds to block 36 where the flag indicating that a Temporary Format assembly is active is now reset. This means, in FIG. 1, block 24, that any subsequent format changes are treated as permanent format changes. The content of the associated format state will be modified, as per block 26, FIG. 1, but the value of that format state which exists immediately prior to this permanent change is not stored for later recall.

Accordingly, the format changes specified after a Begin Temporary Format Change control code and before an End Temporary Format Change control code are processed as temporary format changes with the assumption that a Return to the Previous Format control code will be subsequently issued. To accommodate this request the formatting states which existed immediately prior to the processing of these temporary format changes are stored together, with the identifier, for convenient recall.

Normally a succession of text, graphics, or other codes not associated with this invention are then processed after the one or more temporary format changes, described above, have been processed. The process described in the flow chart of FIG. 1 is transparent to these codes. Eventually, it will be desired to return to the previous format which existed before these formatting changes were made. A Return to Previous Format control code in the data stream is detected at block 23, FIG. 1, and causes the operation to branch to the process which begins at FIG. 3.

A Return to Previous Format control code may be specified to be either immediate or conditional. Thus, at block 41 in FIG. 3 if the Return to Previous Format control code is immediate the operation proceeds to block 42. The Return to Previous Format control code must specify an identification of the previous format to be reinstated. Assume now that the identification established at block 31, FIG. 2 for the format changes described above was "1". Assume further, that the Return to Previous Format control code presently being processed specifies "1" as the identification of the format to be restored.

Figure 3:
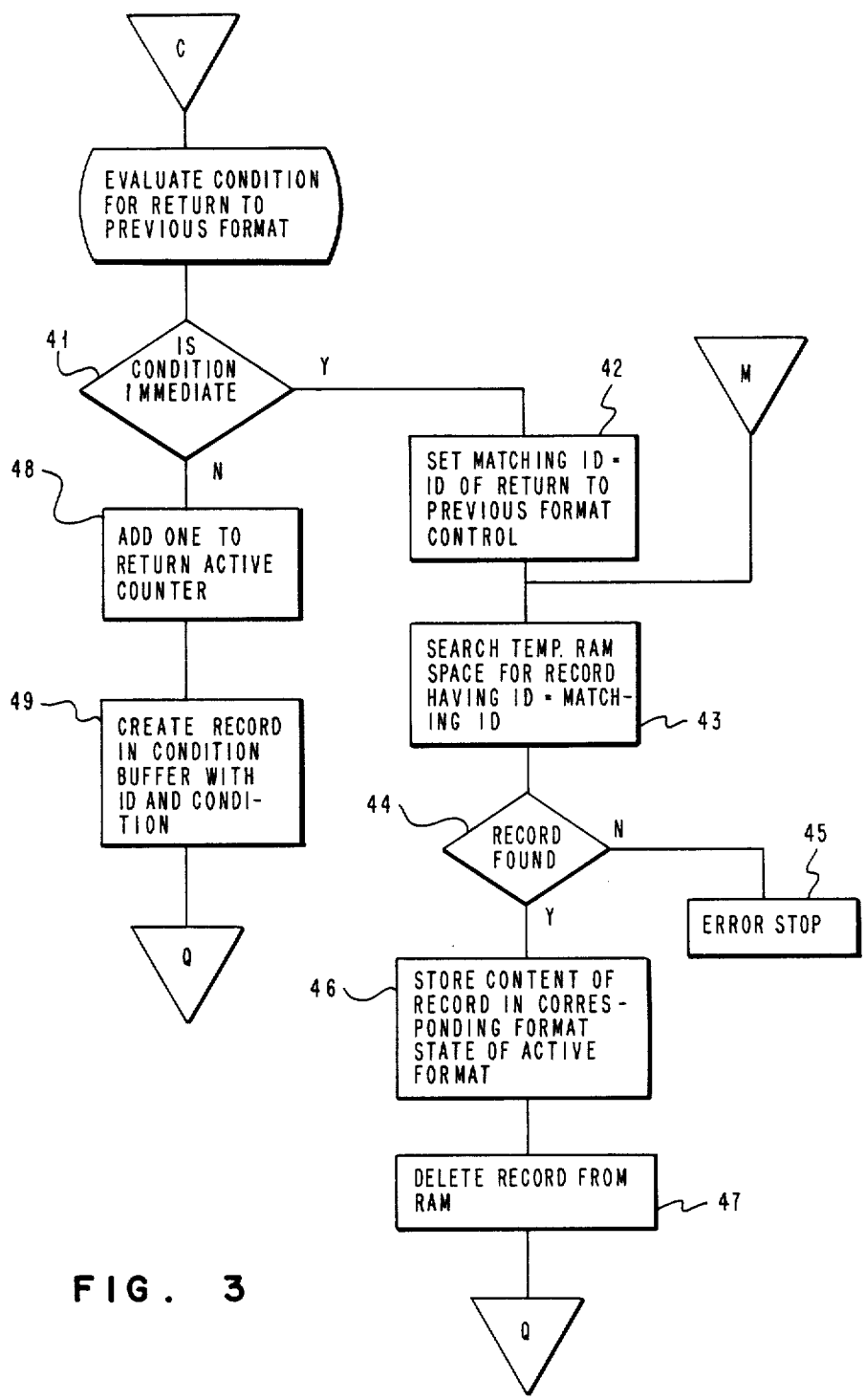
FIGS. 3 and 4 are programming flow charts which describe the logical operations performed in accordance with the detection of a Return to Previous Format control codes.

Accordingly, at block 42, FIG. 3, a "Matching ID" register is loaded with a "1" which is the identification with the the Return to Previous Format control. At 43 the random access memory space, where the records are stored which contain the current format states before temporary format changes, is searched to locate the record with an identification of "1". If no record is found, the process is stopped because of the error of specifying the return to a format which was not previously defined. Assuming that the record was found at block 44, the operation proceeds to 46 where the contents of this record are used to reinstate the values of the formatting parameters which were altered by the temporary format change which had an ID of "1". Thereafter, at 47 the record of these preexisting format parameter values is deleted from the random access memory.

Referring again to block 41, FIG. 3, assume that a future condition was specified with the Return to Previous Format control code. In that case, the condition is not immediate and, at block 48 a Return Active counter is incremented by one. Then, at block 49 a record is created which contains the identifier of the previous format to which the return is requested and the condition on which the request is to be honored. This record is then stored in a Condition buffer.

Figure 4:
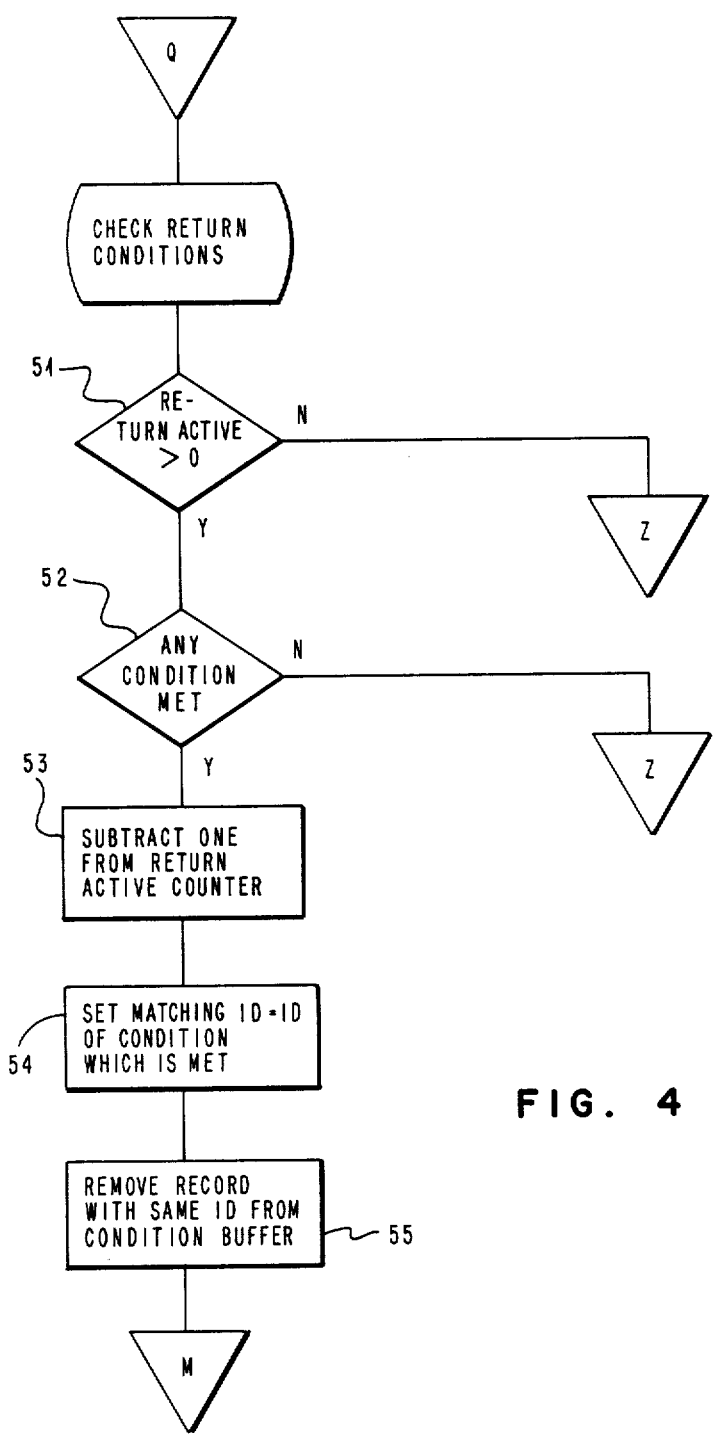

After the processing at either of blocks 47 or 49, FIG. 3, the operation proceeds to "Q" in FIG. 4. At 51 the Return Active counter is tested to determine if it is greater than zero. It will be greater than zero if the Return to Previous Format control code specified future conditions on which to base a Return to Previous Format, which future conditions have not been met.

Assume now that at least one such future condition was specified so that the Return Active counter was incremented at block 48, FIG. 3. Thus, in FIG. 4, at block 51 the operation proceeds to block 52 where each of the conditions stored in the Condition buffer are tested to determine if those conditions compare to a current condition in the text editing process. If a condition stored relative to any of the identifiers in the Condition buffer is met, at block 53 the Return Active counter is decremented by one, and at block 54 the Matching ID register is loaded with the identifier in the Condition buffer associated with the condition which is currently being met. Then, at block 55 this particular record is removed from the Condition buffer and the operation branches back to "M" in FIG. 3 to restore the formatting parameters to their preexisting states prior to the temporary formatting changes.

In FIG. 4, at block 52, at each processing cycle of the system, if no condition is met which compares equally with any of the conditions stored in the condition buffer, the operation proceeds back to "Z" in FIG. 1 to process the next code in the data stream. Also in FIG. 4, at block 51 if the Return Active counter is zero, then there are no stored conditions to be compared with current conditions and the operation proceeds back to "Z".

Accordingly, a very efficient and memory conserving process has been described for accommodating temporary format changes for cases in which it is desired to return to a format which existed before those temporary changes were effected. The Return to the Previous Format which existed before the temporary changes were made can be either immediate or conditional. The immediate return may be used for the example given above of a quotation. The Begin/End Temporary Format Change pair would occur in the data stream just prior to the quotation, and the Return to Previous Format would immediately follow the quotation, as is shown pictorially in FIG. 5.

Figures 5, 6:
FIGS. 5-7 are text and graphics examples which show the use of the new formatting controls of this invention in effecting temporary format changes.

A delayed Return to Previous Format may be used in formatting text which is to "run around" a picture or other non-text object. Referring to FIG. 6, the Begin/End Temporary Format Change pair is inserted by the operator at the end of the line of text which occurs just prior to the picture. This is followed by the Return to Previous Format control code specifying a condition equal to the length of the picture.

Figure 7:
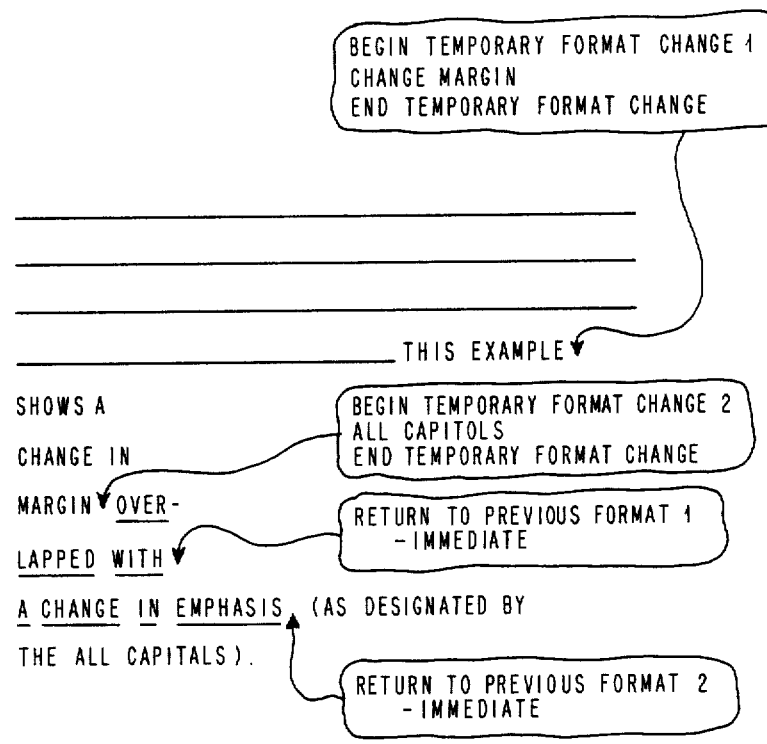

These controls are designed such that two or more temporary format changes may be overlapped. FIG. 7 shows a pictorial representation of the use of overlapped temporary format change control codes. This is accomplished with these controls because: (a) only the format states affected by the temporary format changes are saved and, therefore, returned and (b) each temporary format change is stored with an ID so that they can be accessed individually for return.

While the invention has been shown and described with reference to particular embodiments thereof, it will be understood by those skilled in the art that the foregoing and other changes in form and details may be made therein without departing from the spirit and scope of the invention.

I claim:

1. A method of formatting data having a plurality of format parameters by a data processing system for output to a printer or other output device, comprising:
   storing in a memory of said data processing system, in response to a first data stream control for causing a present value of a selected format parameter of said plurality of format parameters to be changed to a second value, said present value of said selected format parameter prior to said change and an identifier corresponding said first data stream control;
   thereafter changing by said data processing system a value of another format parameter of said plurality of format parameters to a second value; and
   thereafter controlling by said data processing system the format, during said data output, in accordance with said second value of said another format parameter and said stored present value of said selected format parameter, in response to the detection of another data stream control which includes said identifier.

2. The method of claim 1 wherein said first data stream control comprises first and second control codes.

3. The method of claim 2 wherein said first and second control codes delimit said second value of said selected format parameter.

4. The method of claim 3 wherein said step of storing further comprises beginning the storing of said present value and said identifier in response to the detection of said first control code.

5. The method of claim 4 wherein said step of storing further comprises ending said storing in response to the detection of said second control code.

6. The method of claim 5 wherein said step of controlling said format further comprises returning immediately to said present value of said selected format parameter in response to said detection of said another data stream control.

7. The method of claim 5 wherein said step of controlling said format further comprises returning to said present value of said selected format parameter in response to said detection of said another data stream control and the detection of a condition specified with another data stream control.

8. The method of claim 7 wherein said condition is an occurrence of a specified subsequent event.

9. The method of claim 8 wherein said subsequent event is the occurrence of a predetermined line count.

10. The method of claim 8 wherein said subsequent event is the passage of a predetermined number of lines of formatted data.

11. The method of claim 8 wherein said subsequent event is the passage of a predetermined distance of formatted data output.

12. A method of formatting data having a plurality of format parameters by a data processing system for output to a printer or other output device, comprising:
   storing in a memory of said data processing system, in response to a first data stream control of a first type for causing a present value of a first format parameter of said plurality of format parameters to be changed to a second value, said present value of said first format parameter prior to said change of said first format parameter and a first identifier corresponding to said first data stream control of said first type;
   storing in said data processing system memory, in response to a second data stream control of said first type for causing a present value of a second format parameter of said plurality of format parameters to be changed to a second value, said present value of said second format parameter prior to said change of said second format parameter and a second identifier corresponding to said second data stream control of said first type;
   thereafter controlling by said data processing system the format, during said data output, in accordance with said second value of said second format parameter and said stored present value of said first format parameter, in response to the detection of a first data stream control of a second type which includes said first identifier; and
   thereafter controlling by said data processing system the format, during said data output, in accordance with said stored present value of said first format parameter and said stored present value of said second format parameter, in response to the detection of a second data stream control of said second type which includes said second identifier.

13. A data processing system for formatting data having a plurality of format parameters for output to a printer or other output device, comprising:
   means for storing in a memory of said data processing system, in response to a first data stream control for causing a present value of a selected format parameter of said plurality of format parameters to be changed to a second value, said present value of said selected format parameter prior to said change and an identifier corresponding to said first data stream control;
   means for thereafter changing a value of another format parameter of said plurality of format parameters to a second value; and
   means for thereafter controlling the format, during said data output, in accordance with said second value of said another format parameter and said stored present value of said selected format parameter, in response to detection of another data stream control which includes said identifier.

14. The system of claim 13 wherein said means for controlling said format further comprises means for returning immediately to said present value of said selected format parameter in response to said detection of said another data stream control.

15. The system of claim 13 wherein said means for controlling said format further comprises means for returning to said present value of said selected format parameter in response to said detection of said another data stream control and the detection of a condition specified with said another data stream control.

* * * * *

UNITED STATES PATENT AND TRADEMARK OFFICE
CERTIFICATE OF CORRECTION

PATENT NO. : 4,831,583

DATED : May 16, 1989

INVENTOR(S) : Robert A. Pascoe

It is certified that error appears in the above-identified patent and that said Letters Patent is hereby corrected as shown below:

Col. 7, line 27, after "corresponding" insert --to--.

Col. 7, line 61, before "another" insert --said--.

Signed and Sealed this

Seventh Day of January, 1992

Attest:

HARRY F. MANBECK, JR.

*Attesting Officer*  *Commissioner of Patents and Trademarks*